US006794927B2

(12) United States Patent
Bedarida et al.

(10) Patent No.: US 6,794,927 B2
(45) Date of Patent: Sep. 21, 2004

(54) MODULAR CHARGE PUMP ARCHITECTURE

(75) Inventors: Lorenzo Bedarida, Vinercate (IT); Stefano Sivero, Vergiate (IT); Davide Manfre, Bologna (IT)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/328,911

(22) Filed: Dec. 24, 2002

(65) Prior Publication Data

US 2004/0046603 A1 Mar. 11, 2004

(30) Foreign Application Priority Data

Sep. 6, 2002 (IT) .................................... MI2002A1902

(51) Int. Cl.[7] .................................................. G05F 1/10
(52) U.S. Cl. ...................................................... 327/536
(58) Field of Search ................................ 327/530, 534, 327/535, 536, 537

(56) References Cited

U.S. PATENT DOCUMENTS 5,216,588 A 6/1993 Bajwa et al. ................. 363/60
5,550,728 A 8/1996 Ellis ............................ 363/60
5,767,735 A * 6/1998 Javanifard et al. .......... 327/536
5,969,565 A * 10/1999 Naganawa .................. 327/536
6,163,487 A 12/2000 Ghilardelli ............. 365/189.09
6,208,198 B1 * 3/2001 Lee ............................ 327/536
6,275,096 B1 8/2001 Hsu et al. .................... 327/535
6,414,881 B1 7/2002 Fujii et al. ............. 365/189.09
6,472,926 B2 * 10/2002 Taito et al. ................. 327/536
6,597,235 B2 * 7/2003 Choi .......................... 327/536
6,614,292 B1 * 9/2003 Chung et al. ............... 327/536
2002/0130701 A1 9/2002 Kleveland ................... 327/536

* cited by examiner

*Primary Examiner*—Jeffrey Zweizig
(74) *Attorney, Agent, or Firm*—Thomas Schneck

(57) ABSTRACT

An voltage regulation apparatus for generating a supply voltage internally within an integrated circuit with a modular arrangement of charge pumps. The charge pumps feature a first plurality of parallel-connected blocks of charge pump stages including a first block of charge pump stages, a last block of charge pump stages, and at least one intermediate block of charge pump stages therebetween. Each of the parallel-connected blocks of charge pump stages includes a group of a second plurality of charge pump stages cascade-connected in series; and an output stage connected to an output node. Desired output voltages are obtained by using combinatorial clock signals, generated by a logic circuit, directed to the various charge pump stages.

11 Claims, 10 Drawing Sheets

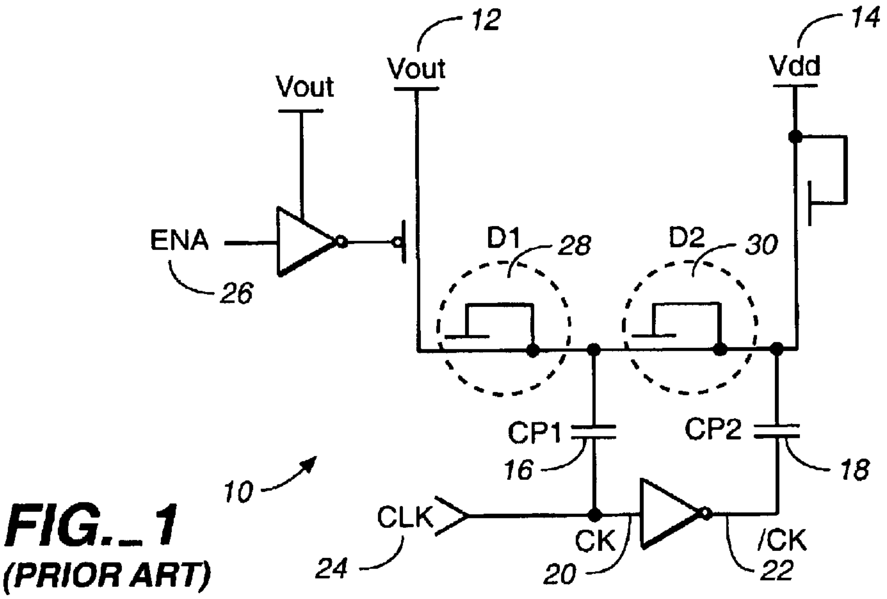
FIG._1
(PRIOR ART)
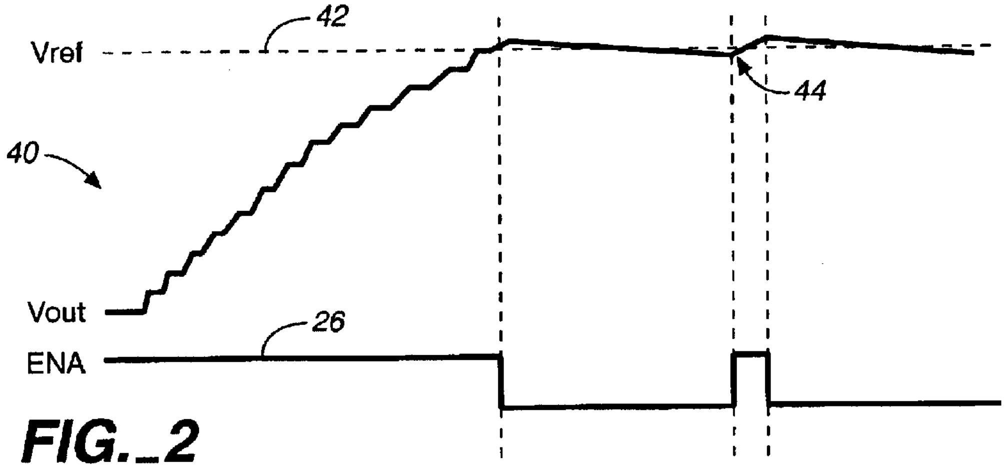
FIG._2
(PRIOR ART)
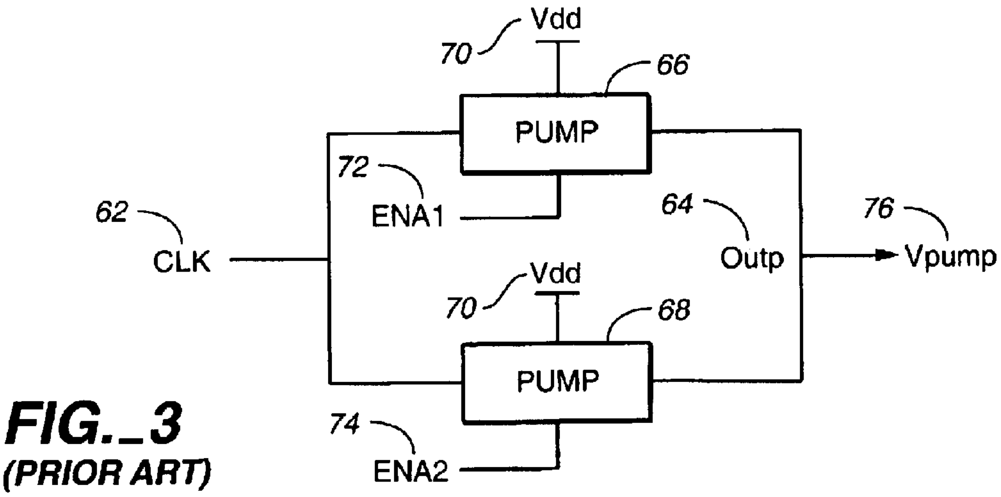
FIG._3
(PRIOR ART)

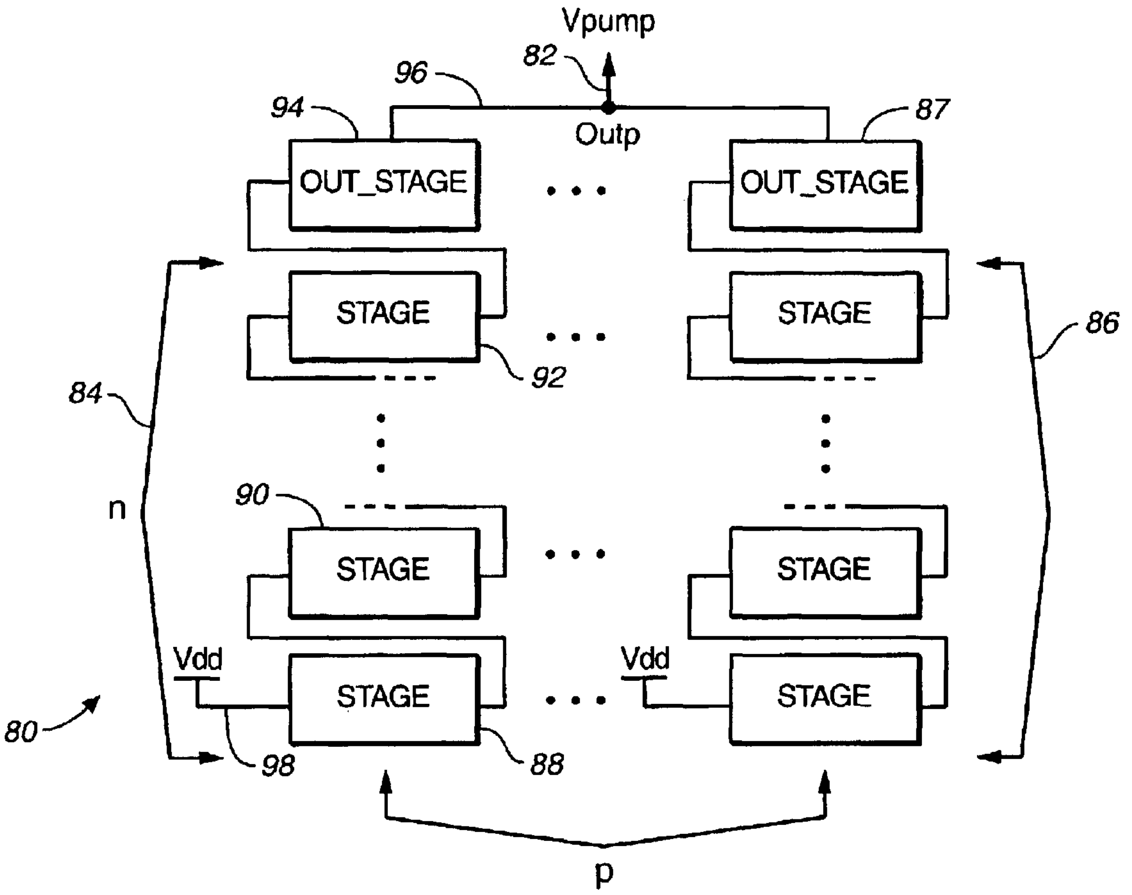
FIG._4
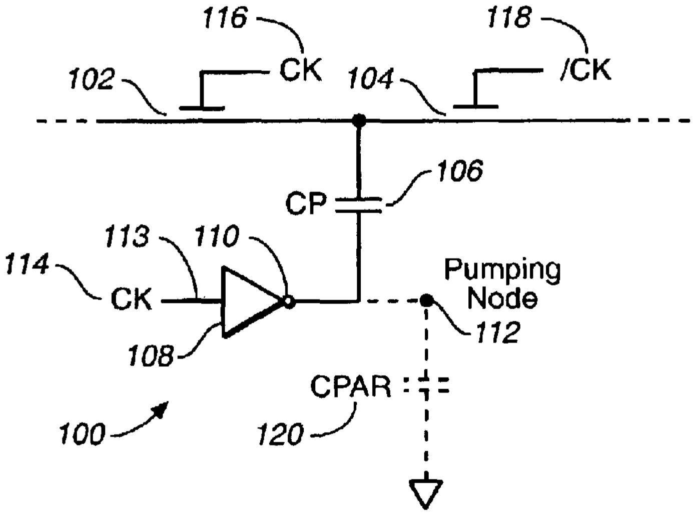
FIG._5

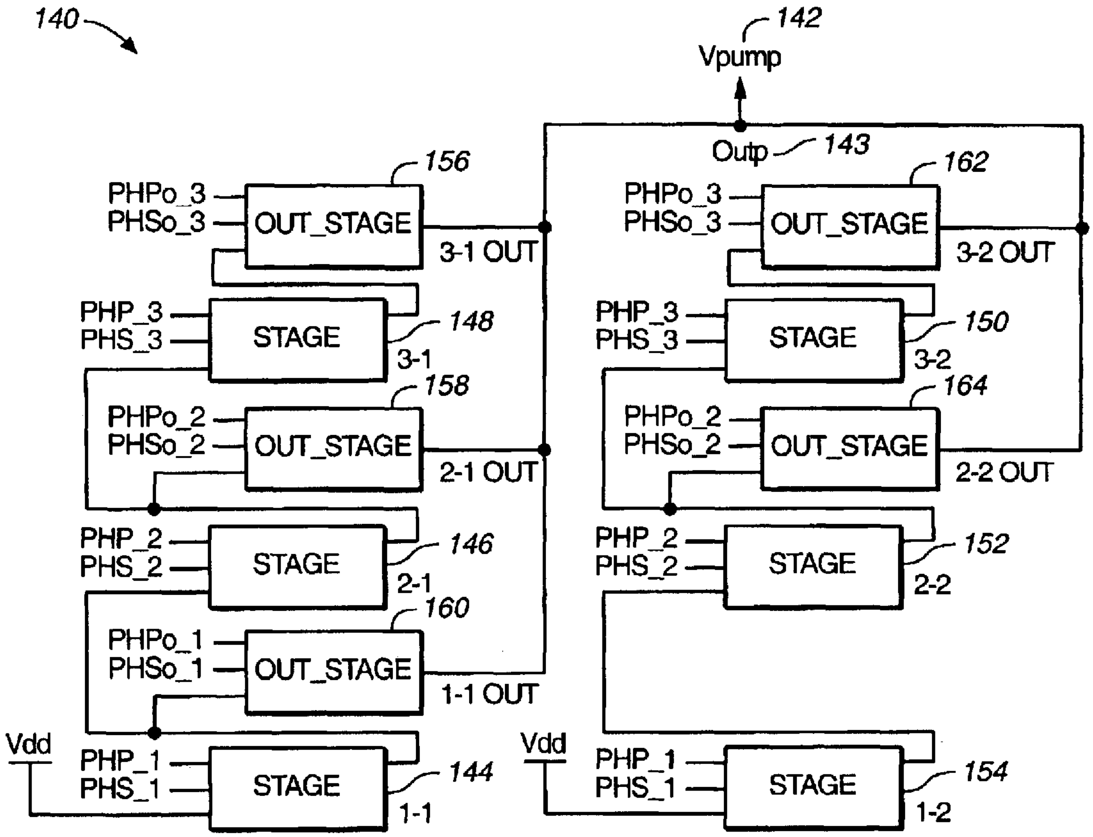
FIG._6A

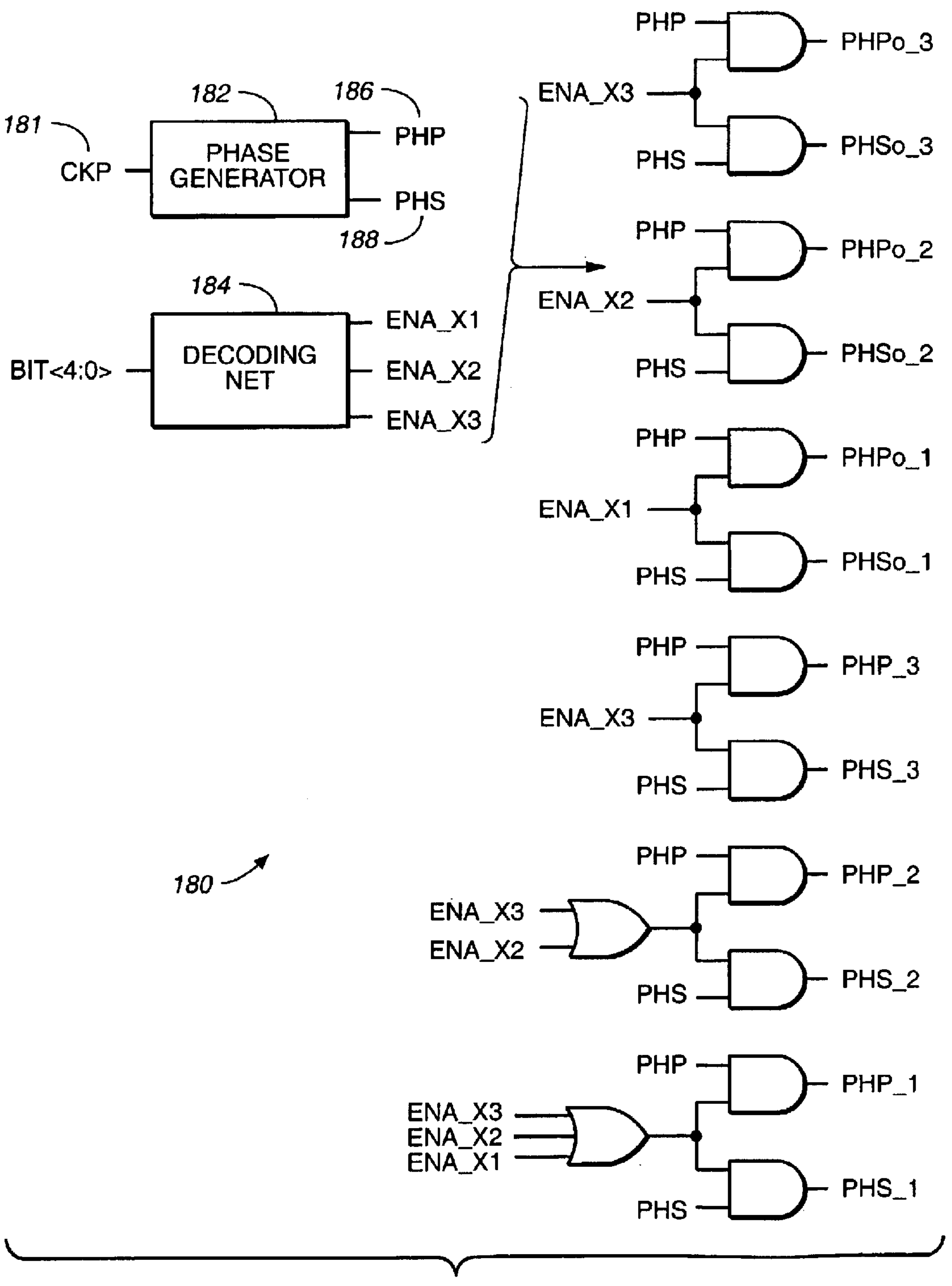
FIG._6B

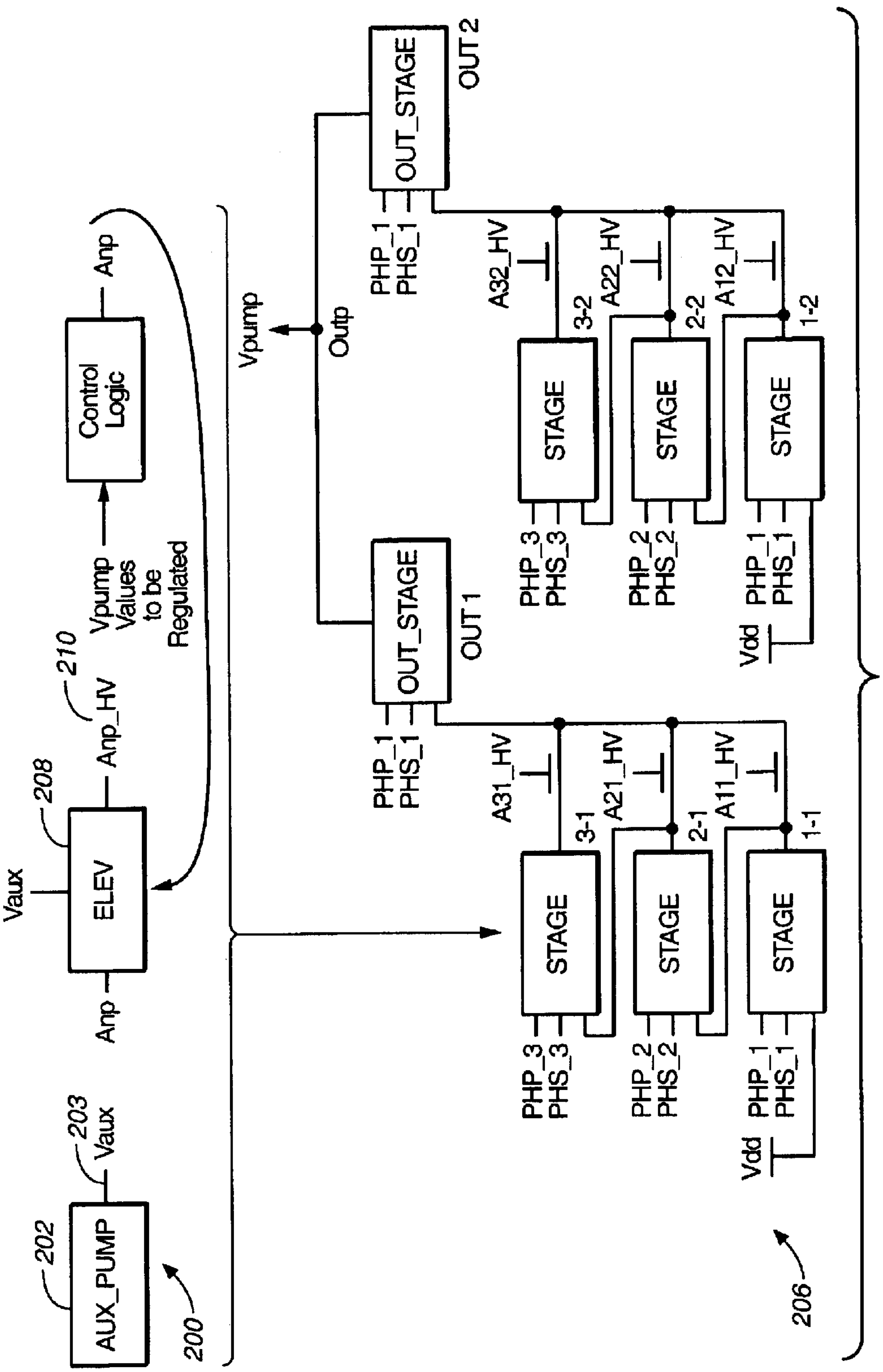
FIG._7

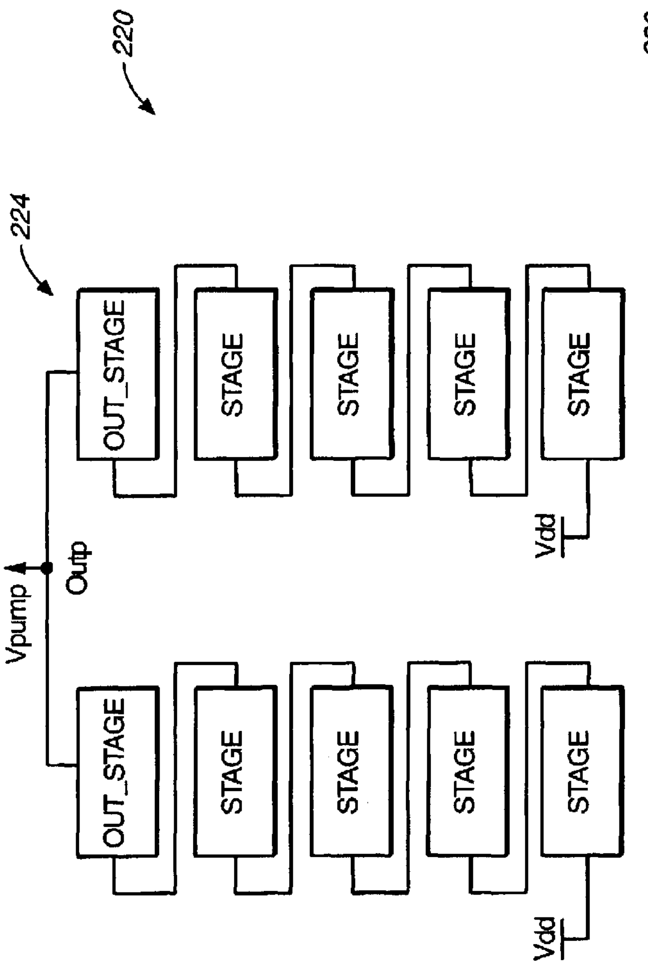
FIG._8A
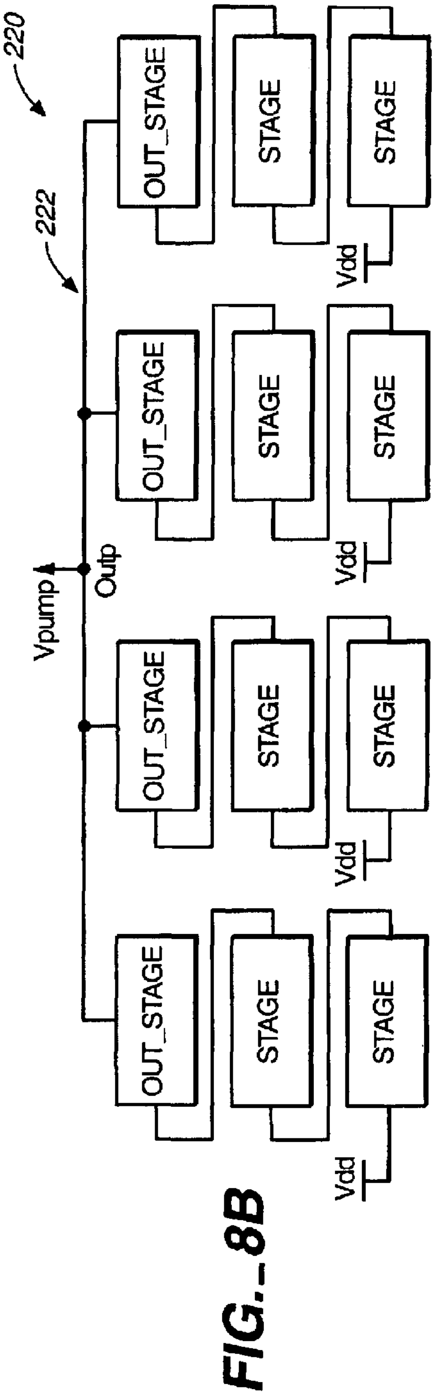
FIG._8B

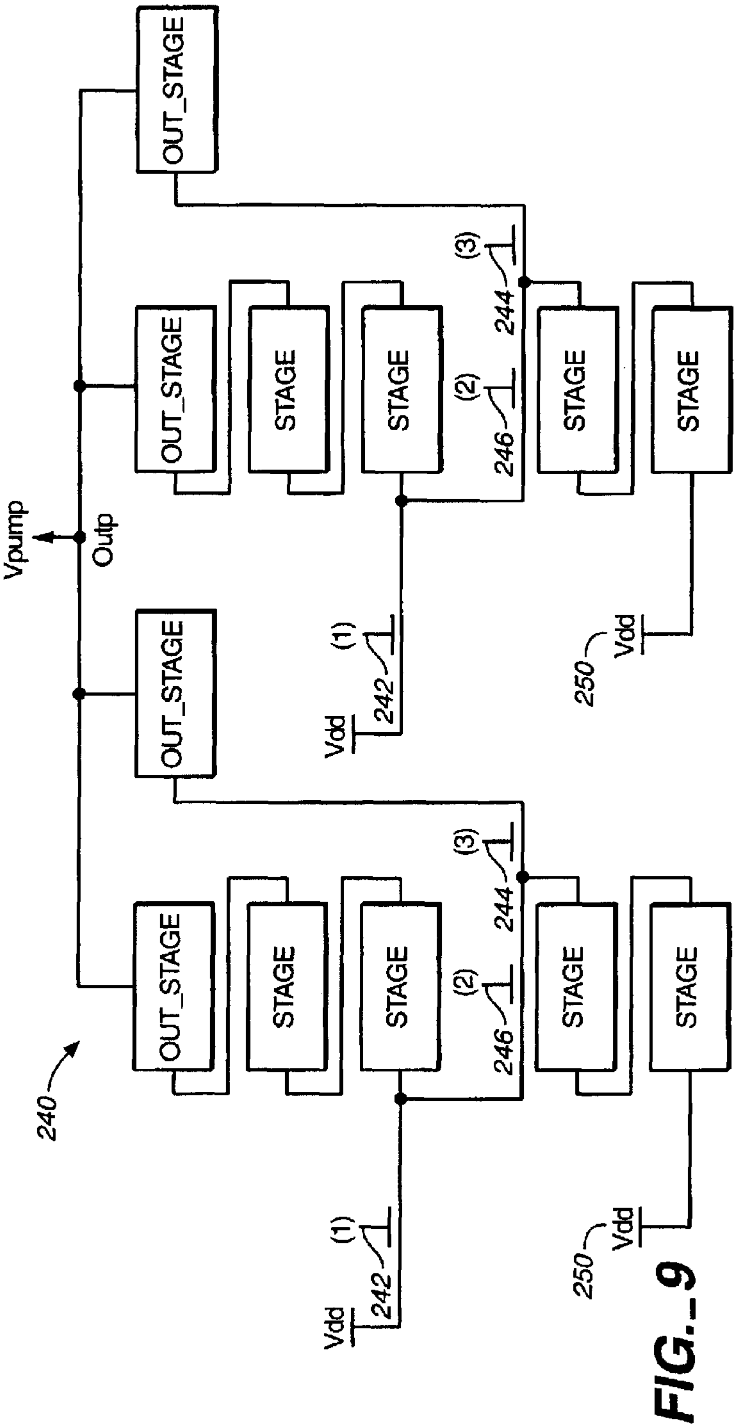
FIG._9
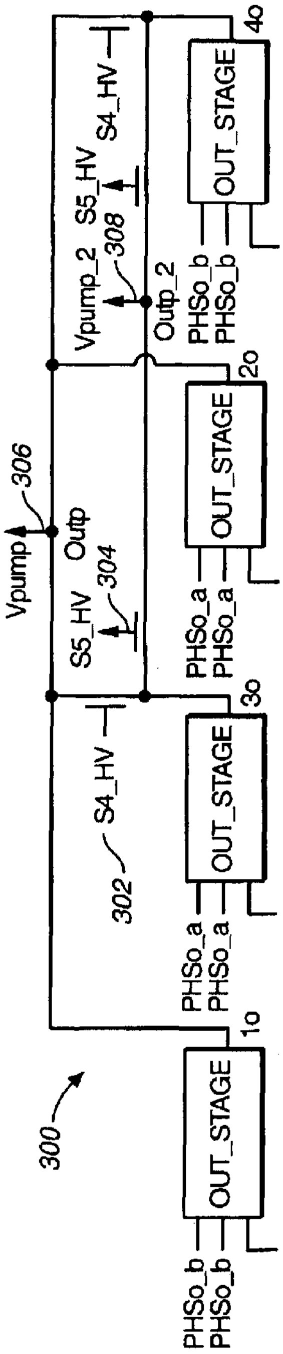
FIG._11

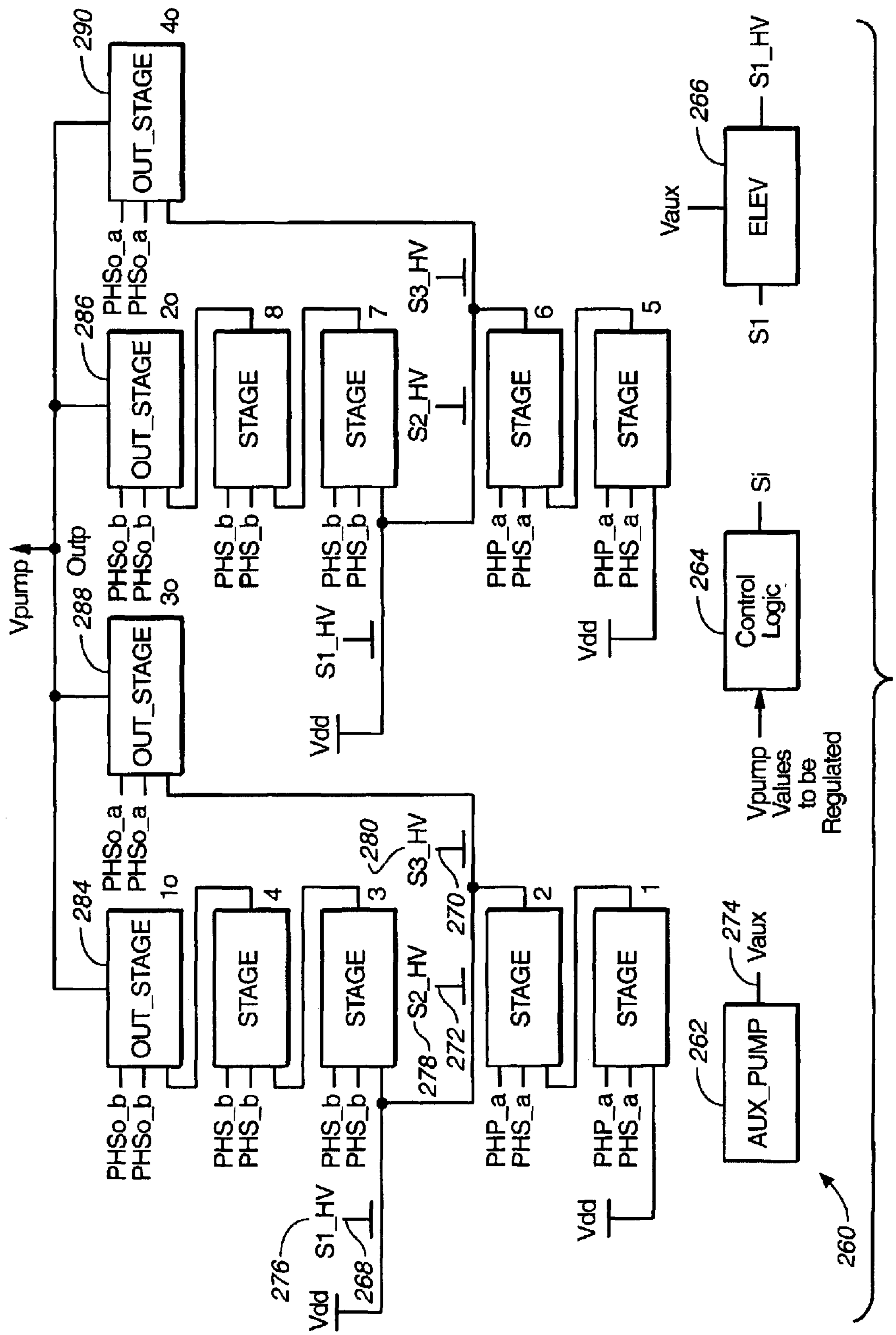
FIG._10

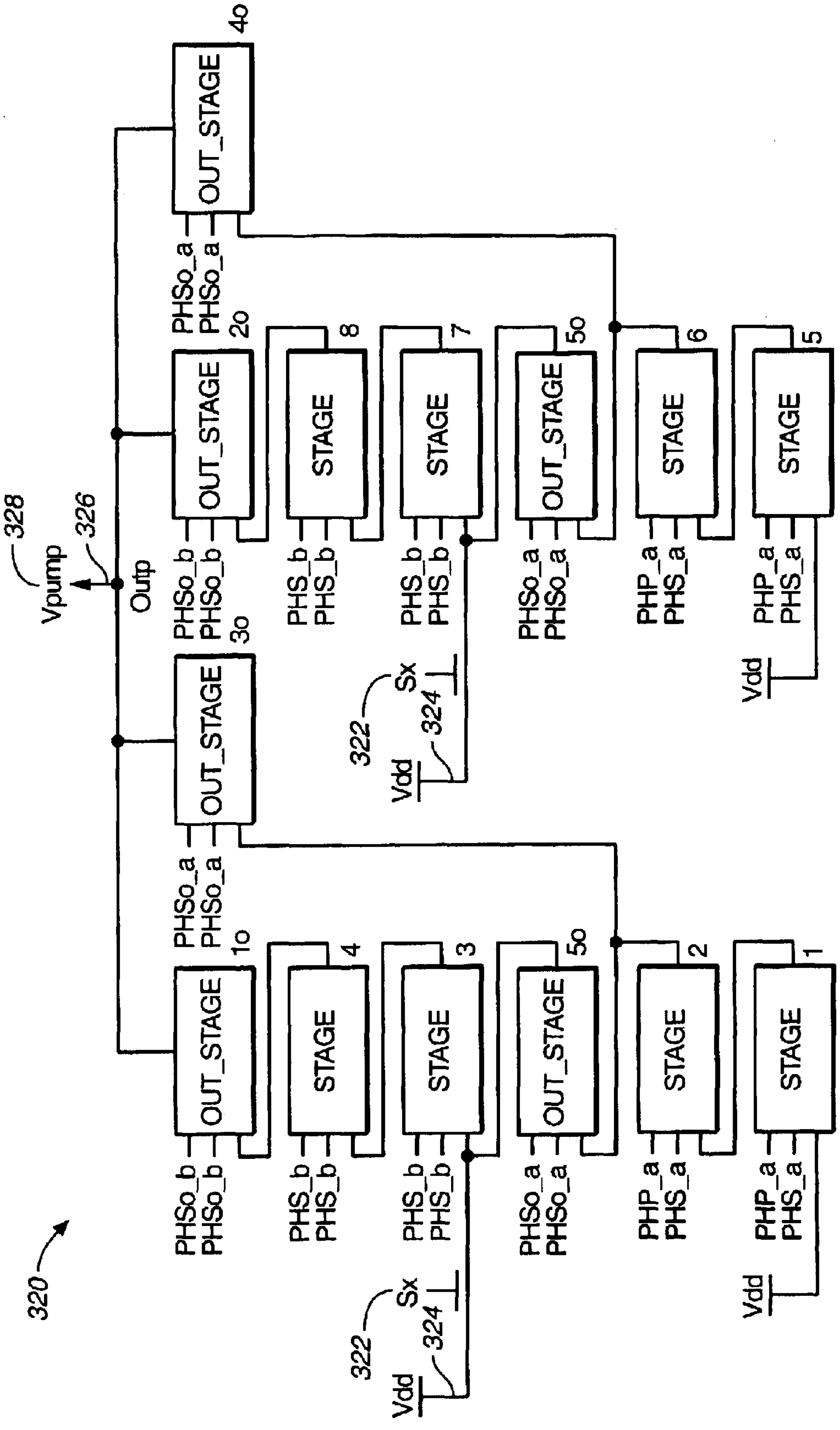
FIG._12

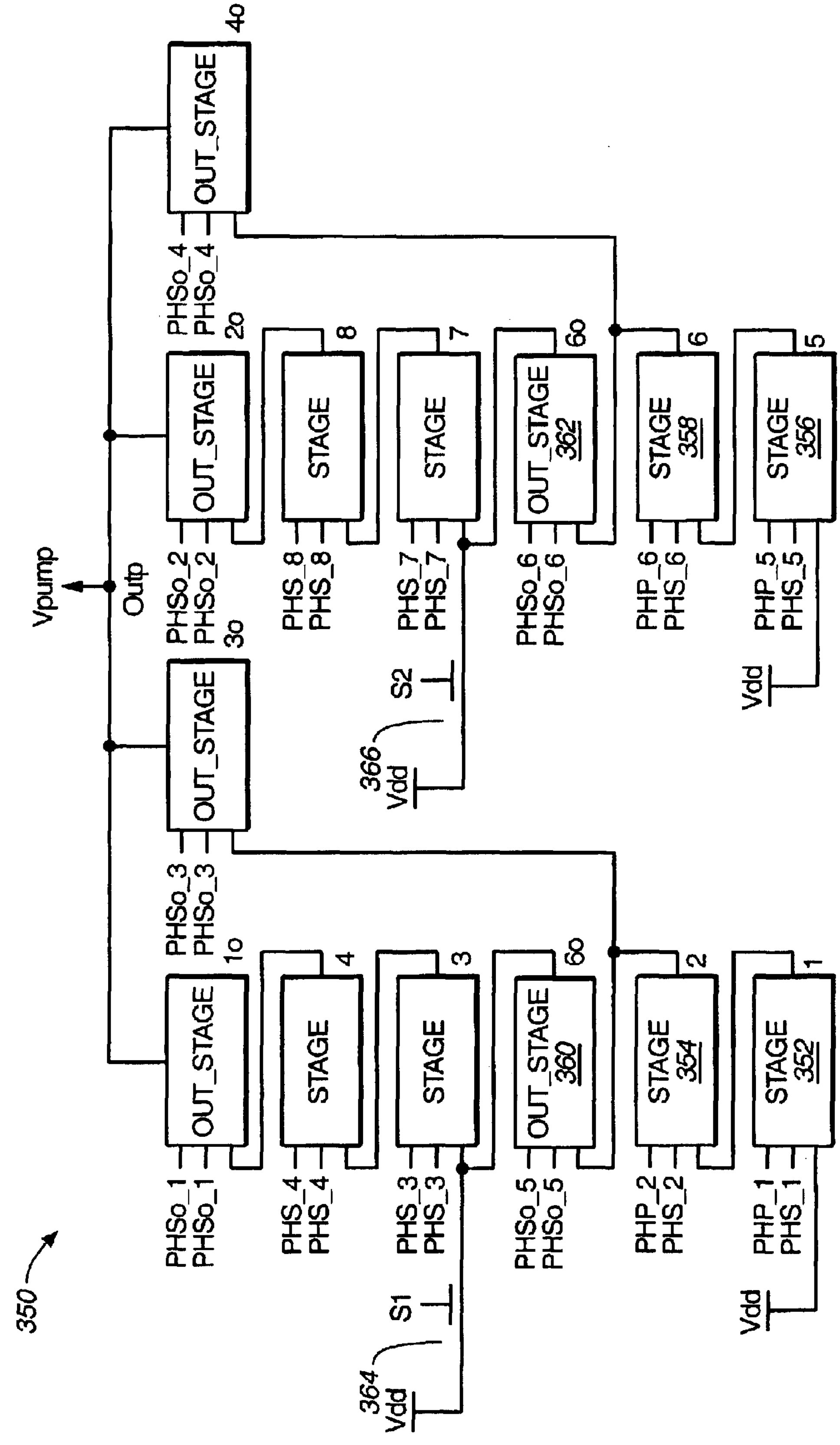
FIG._13

MODULAR CHARGE PUMP ARCHITECTURE

TECHNICAL FIELD

The present invention relates to the field of the integrated circuit design, and more specifically, to the field of charge pump circuits.

BACKGROUND OF THE INVENTION

Memory circuits often require the internal generation of boosted voltages that are needed to program, erase or read the individual memory cells. In the prior art, it is well known that a charge pump circuit can be used to boost voltages supplied by an external voltage source, so that the boosted voltages can be used for program, erase or read operations on the individual memory cells. Depending on voltage and current requirements, different pump architectures are needed, in terms of parallel and series stages. During some internal operation modes a plurality of voltage values may be needed on a node boosted by means of a charge pump.

FIG. 1 depicts a simple schematic diagram for a typical charge pump 10 used to generate a supply voltage Vout 12 from a first constant voltage input Vdd 14. Capacitors CP1 16 and CP2 18 are alternately held at charge pump clock signal CK 20 and its inverse /CK 22, provided by an external signal CLK 24, which determines the charge transfer rate. A control signal ENA 26, controls the on-off switching of the pump 10. A regulator (not shown) disables the clock CLK 24 and/or the ENA signal 26 once the Vout voltage 12 has reached the desired value, Vref 42, as shown in FIG. 2. Due to the current consumption Vout decreases. Once Vout has reached a fixed value 44 lower than Vref 42, the regulator (not shown) enables the charge pump 10 (of FIG. 1) again. A multiplicity of voltage values can be achieved by increasing the number of diodes/stages from the two stages (D1 28 and D2 30), as shown in FIG. 1.

It is well known in the art that demand for current Ipump from an internal regulated voltage Vpump varies depending on the operational state of the memory. As shown in FIG. 3, the current consumption on the output pump node Outp 64 can be sustained by means of 2 charge pumps 66 and 68, properly enabled by control signals ENA1 72 and ENA2 74, working in parallel between Vdd 70 and Outp 64, furnishing the same Vpump voltage 76, and furnishing the requested Ipump (not shown).

However, there are two major problems that charge pumps furnishing a plurality of voltage values on a single output node Outp have to address: (1) how to obtain a good efficiency by increasing the Ipump/Isupply ratio, where Isupply is the current consumption from the Vdd voltage supply; and (2) how to reduce the Vr/Vpump ratio, where Vr is the ripple amplitude.

These problems are exacerbated when a low Vpump value has to be obtained on an Outp node of a charge pump including a number of serial stages exceeding the minimum number N needed to obtain the required high Vpump voltage. Indeed, in this example, a significant part of the supply current Isupply is used to charge/discharge the capacitors of the "useless" stages of the pump, so that even if the Ipump requested on the Outp node is low, a huge current consumption from Vdd is observed. For example, the pump that has been previously tuned on a high Vpump value, is now tuned to furnish a lower Vpump value. If this is the case, the same internal nodes of the pump charged at high potential values corresponding to a high Vpump value, have to yield a lower Vpump value without being re-charged to proper potential values corresponding to the desired lower Vpump value. This results is a spurious pumping and in a relatively high ripple voltage Vr on the Outp node, until the steady state is reached.

SUMMARY OF THE INVENTION

We have solved the above-mentioned problem by having different pumps working in parallel, as in FIG. 3, but each one furnishing a different voltage and properly enabled. We have provided a modular charge pump structure made of selectable parallel pumps, each one giving a different voltage Vpump, and each one furnishing a desired current Ipump, but without significantly increasing the area of the integrated circuit occupied by this flexible charge pump structure.

The present invention provides a charge pump architecture featuring a modular arrangement of charge pumps. The charge pumps are arranged as a plurality of charge pump stages connected in a plurality of paths between an input node receiving a supply voltage and an output node delivering an output voltage, with pump stages each having an activation line receiving an enabling signal that activates the pump stage. The activation lines are fed by a logic circuit having an arrangement of logic elements simultaneously generating enabling signals corresponding to a desired output voltage. The term "simultaneous generating" includes all phase variants of a pulse, since phase variants are responsible for clocking various pump stages in proper sequence. This allows a number and arrangement of simultaneously selectively activated pump stages to produce a desired output voltage.

One aspect of the present invention is directed to an apparatus comprising a first plurality of parallel-connected blocks of charge pump stages including a first block of charge pump stages, a last block of charge pump stages, and at least one intermediate block of charge pump stages therebetween.

In one embodiment of the present invention, each of the parallel-connected blocks of charge pump stages includes a group of a second plurality of charge pump stages cascade-connected in series; and an output stage connected to an output node.

In one embodiment of the present invention, each of the charge pump stages further comprises: (a) a first switch; (b) a second switch; (c) a boost capacitor electrically communicating with the first switch and the second switch; and (d) an inverter with an output electrically communicating with the boost capacitor and a pumping node. In this embodiment, the inverter having an input receives an enabling clock signal to the boost capacitor, and the first and second switches are operated by clock signals corresponding to the enabling clock signal.

In another embodiment of the present invention, each of the charge pump stage further comprises a positive charge pump. In an alternative embodiment of the present invention, each of the charge pump stages further comprises a negative charge pump.

In another embodiment of the present invention, there is an integer first plurality of P blocks with an integer N of charge pump stages in each block. In this embodiment, a total number T of charge pump stages is equal to NP and a number of output stages is equal to P.

Another aspect of the present invention is directed to an apparatus for generating a supply voltage internally within an integrated circuit comprising an integer plurality of M single (N, P) charge pumps.

In yet another embodiment of the present invention, each single (N, P) charge pump includes an integer P of parallel-connected blocks of charge pump stages comprising a first block of charge pump stages, a last block of charge pump stages, and at least one intermediate block of charge pump stages therebetween.

In another embodiment, each of the parallel-connected blocks of charge pump stages includes a group of an integer N of the charge pump stages cascade-connected in series; and an output stage connected to an output node. In this embodiment, an integer T of total number of charge pump stages is equal to PMN; and an integer O of output stages is equal to PM.

Yet, one more aspect of the present invention is directed to an apparatus for generating a supply voltage internally within an integrated circuit comprising an integer plurality of M single charge pumps, wherein a first single charge pump comprises a single ($n_1$, $p_1$) charge pump, wherein at least one intermediate single charge pump therebetween comprises a single ($n_i$, $p_i$) charge pump, and wherein a last single charge pump comprises a single ($n_M$, $p_M$) charge pump.

In another embodiment of the present invention, each single ($n_i$, $p_i$) charge pump includes a $p_i$ integer of parallel-connected blocks of charge pump stages comprising a first block of charge pump stages, a last block of charge pump stages, and at least one intermediate block of charge pump stages therebetween.

In another embodiment, each of the parallel-connected blocks of charge pump stages includes a group of an integer $n_i$ number of charge pump stages cascade-connected in series; and an output stage connected to an output node. In this embodiment, an integer O of output stages is equal to $\Sigma_{i=1}^{i=M}(p_i)$; and an integer T of total number of charge pump stages is equal to $\Sigma_{i=l}^{i=M}(n_i\, p_i)$ wherein i is an integer less or equal to M.

In yet another embodiment, in each single ($n_i$, $p_i$) charge pump, $n_i$ is greater than or equal to $p_i$. In an alternative embodiment, $p_i$ is greater than or equal to $n_i$. Herein, $n_i$ is less than or equal to N; and $p_i$ is less or equal to P, wherein an integer P is a total number of parallel-connected blocks of charge pump stages, and an integer N is a total number of charge pump stages cascade-connected in series. In one embodiment, an integer S groups of control signals are used to control each charge pump stage, and at least one group of the control signals is used to control the charge pump stage.

In an embodiment of the invention, the apparatus of the present invention comprising the plurality of M single charge pumps, includes an integer plurality of $Q_1$ different configurations of single charge pumps. In a further, for each configuration, each output stage is connected to the output node, an integer plurality of $C_1$ charge pump stages is disabled. The apparatus is adaptively tuned among the plurality of $Q_1$ different configurations by using a plurality of control signals in order to optimize generation of the supply voltage and supply current at the output node, and to minimize a ripple voltage at the output node.

One additional aspect of the present invention is directed to an apparatus for generating a supply voltage internally within an integrated circuit comprising an integer plurality of M single charge pumps, and an auxiliary pump. The auxiliary pump is configured to generate an auxiliary voltage used as a reference voltage for an integer plurality of $S_1$ control signals.

In another embodiment, an integer number $MIN_1$ of enabled output stages is minimized. In one embodiment, each enabled output stage is connected to the output node by using an integer plurality of $U_1$ switches, wherein at least one control signal is used to control the charge pump stage.

In still another embodiment, the apparatus of the present invention comprising the plurality of M single charge pumps, includes an integer plurality of $Q_1$ different configurations of single charge pumps. In one embodiment, for each configuration, each output stage is connected to the output node, and an integer plurality of $C_1$ charge pump stages is disabled. The apparatus is adaptively tuned among the plurality of $Q_1$ different configurations by using a plurality of control signals in order to optimize generation of the supply voltage and supply current at the output node, and to minimize a ripple voltage at the output node.

BRIEF DESCRIPTION OF DRAWINGS

FIG. 1 depicts a prior art charge pump

FIG. 2 illustrates the supply voltage characteristics of the charge pump of FIG. 1 as a function of an enabling signal.

FIG. 3 shows a prior art charge pump architecture comprising two parallel charge pumps.

FIG. 4 is a plan view of an apparatus of the present invention for generating a supply voltage Vpump internally within an integrated circuit.

FIG. 5 illustrates a charge pump stage of the apparatus of FIG. 4 in more detail.

FIG. 6A depicts a dynamic charge pump architecture of the present invention in which the number of charge pump stages n=1, 2, or 3, and the number of parallel stages p=2; that is n≧p, and the number of output stages is not optimized.

FIG. 6B illustrates the working of the control circuitry of the dynamic charge pump structure of FIG. 6A of the present invention.

FIG. 7 depicts the charge pump architecture of the present invention, wherein "n" is always ≧"p" (with extension to the case p always ≧n), and the number of output stages is minimized.

FIGS. 8A and 8B illustrate a charge pump architecture (n×p) to a (p×n) pump of the present invention, where the number of output stages is minimized.

FIG. 9 is a plan for implementing a more specific flexible (4×2)-to-(2×4) pump of FIGS. 8 and 8B.

FIG. 10 depicts the real implementation of the circuitry of FIG. 9 comprising the auxiliary pump, the level-shifters for the control signals, and the phases enabled or disabled that feed each single stage.

FIG. 11 illustrates how by applying different control phases to the pump architecture of FIG. 10 to obtain different configurations.

FIG. 12 depicts a (n×p) to a (p×n) pump architecture 320 in one embodiment of the present invention, whereas the number of output stages is not minimized.

FIG. 13 depicts a charge pump architecture of the present invention, wherein by having dedicated phases (PHP, PHS)_a and (PHP, PHS)_b, another pump architecture can be obtained (for example, a (2×2)), and a greater flexibility can be achieved with all stages controlled by different phases.

BEST MODE FOR CARRYING OUT THE INVENTION

With reference to FIG. 4, an apparatus generates a supply voltage Vpump 82 internally within an integrated circuit comprising an integer "p" of parallel-connected blocks of charge pump stages including a first block of charge pump stages 84, a last block of charge pump stages 86, and at least one intermediate block of charge pump stages therebetween (not shown) as an array of charge pump stages. In one embodiment of the present invention, each of the parallel-connected blocks of charge pump stages (84, 86) includes a group of a second plurality "n" of charge pump stages (88, 90, . . . 92) cascade-connected in series; and an output stage 94 connected to an output node Outp 96.

In the embodiment of FIG. 5, a charge pump stage (88, 90 or 92) of the apparatus 80 of FIG. 4 is shown in more detail. More specifically, each of the charge pump stages (88, 90 or 92) of the apparatus 80 of FIG. 4 further comprises a first switch 102, a second switch 104, a boost capacitor 106 electrically communicating with the first switch and the second switch; and an inverter 108 with an output 110 electrically communicating with the boost capacitor and a pumping node 112. The inverter 108 has an input 113 receiving an enabling clock signal 114 to the boost capacitor. The first and second switches are operated by clock signal CK 116 and by the inverted clock signal /CK 118 corresponding to the enabling clock signal CK 114.

The number of charge pump stages in series and in parallel can be varied depending on the Vpump and Ipump values, without a significant increase in chip area occupied needed to furnish the maximum Vpump or Ipump. The present example refers to a pump furnishing a Vpump higher than Vdd (positive pump), but it can be easily extended to a pump furnishing a negative Vpump (negative pump).

Referring still to FIG. 4, the number "p" of charge pumps are working in parallel, each one made of "n" stages in series (STAGE) and an output stage 94 (OUT STAGE). Such a charge pump array will be called a (n×p) pump. One will refer to n as to the "number of series stages" and to p as to the "number of parallel stages". By increasing n, the maximum output voltage Vpump 82, for a Ipump=0 will increase, following the rule:

$$V\text{pump,max}=(n+1)\times Vdd; \qquad \text{(EQ. 1)}$$

in which an ideal pump with a gain-per-stage=Vdd has been considered, i.e. a pump with no losses.

During one clock cycle, one of the p pumps furnishes an average current I_av. If the p pumps work simultaneously, the total average current Ipump is as follows:

$$I\text{pump}=p\times I\_av \qquad \text{(EQ.2)}$$

Suppose desires to regulate a Vpump voltage<Vpump, max. Once n and p are fixed, the greater is Vpump, the lower is Ipump, depending on the output equivalent resistance Rs of the pump, which in turns depends on the clock period Tck, the number n, the pumping capacitance CP (106 of FIG. 5) of each of the n stages, as shown by the following formula for an ideal pump:

$$Rs=(n\times Tck)/CP. \qquad \text{(EQ. 3)}$$

Current consumption from Vdd is:

$$I\text{supply}=(n\times p\times CPAR\times Vdd)/Tck+I\text{pump}\times(n+1)+Iosc; \qquad \text{(EQ. 4)}$$

where CPAR is the parasitic capacitance at the pumping nodes (120 of FIG. 5). Iosc is the current consumption due to the circuitry that generates the pumping and control signals, and it won't be taken into account. From the EQ. 4 it can be seen that even if no current Ipump is requested from the Outp node 96, a consumption Isupply from Vdd 98 is due to the charge/discharge of the CPAR capacitance (120 of FIG. 5) every clock cycle. According to (EQ. 4), Isupply is proportional to n and p. Furthermore, even in an ideal pump, where CPAR=0, if Ipump is fixed, n should be optimized to the minimum value that ensures the generating of the desired Vpump.

In one embodiment of the present invention, the charge pump stage can be a positive charge pump. In another embodiment of the present invention, the charge pump stage can be a negative charge pump.

The goal is to optimize n and p in order to have high efficiency and/or low ripple Vr of the pump, once Vpump and Ipump corresponding to max Vpump are fixed by operational conditions.

As was mentioned above, during some internal operation modes a plurality of voltage values may be needed on a node boosted by means of a charge pump. In this condition n and p should change for every couplet of (Vpump–Ipump) values. To preserve area occupies, a single (n×p) charge pump can be used, properly varying n and p.

Referring still to FIG. 4, suppose one would like to regulate m Vpump values 82 at the Outp node 96. First of all, the m couplets (n,p)__1, (n,p)__2 . . . (n,p)__m optimized for the m Vpump values should be determined. Two embodiments are possible regarding the number n and p of the stages (output stages are not taken into account):

a. In all "m" configurations n≧p, or p≧n.

If this is the case, the total n will be the maximum n among the m couplets, and the total p will be the maximum p among the m couplets.

b. In some "$m_i$" configurations n≧p, wherein in other "$m_k$" configurations p≧n; wherein the combination of all "$m_i$" configurations and all "$m_k$" configurations exhaust all possible "m" configurations.

If this is the case, the charge pump architecture of the present invention should also include a more complex control circuitry including a plurality of switches that would "transform" some parallel stages (like 84, or 86 of FIG. 4) into a series stage (like stages 88 through 92 of FIG. 4) and vice-versa. In the case (b) embodiment, the total number of active stages should include NS, stages, wherein NS is the maximum (n×p) product among the m couplets.

Once the total number of stages is determined, two different further embodiments are possible for the output stages.

c. A first embodiment, wherein the number of output stages is not minimized. An output stage occupies less area than a pumping stage, due to a much smaller CP capacitance. In embodiment (c) the number of switches needed is less than the number of switches needed in embodiment (b), but the number of control signals should increase as compared with the number of control signals needed in embodiment (b).

Referring still to FIG. 4, to implement embodiment (c), it is necessary to: (I) to put in intervening positions "m" groups of output stages (94, . . . 87) properly connected to the "m" stages of the charge pump 80, so that "m" different configurations of the pump can be obtained related to the Vpump 82, while connecting the proper output stage and disabling the stages that are not used; and (ii) to generate (m1+m2) groups of control signals, m1 for the m groups of charge pump stages, and m2 for the m groups of output stages in the embodiment (a) m1=m2=m.

d. In another embodiment, the number of output stages is minimized. In this case, a plurality of switches are needed to properly connect the output stages at the desired point of the pump. The control of these switches involves the use of an auxiliary voltage (not shown in FIG. 4) greater than the highest Vpump 82 to be regulated. To implement this embodiment, it is necessary: (I) to use p max output stages, wherein p max is the maximum p among the m couplets, properly connected to the charge pump stages; (ii) to generate (m1+m3) groups of control signals, m1 for the m groups of charge pump stages, and m3 for the m groups of output stages (in case (a) m3=1, and, typically, m3<m2).

In another embodiment of the present invention, FIG. 6A depicts a charge pump architecture 140 in which n=1, 2, 3 and p=2; that is $n \geqq p$. In this embodiment, the basic scheme 140 includes 3 pumping stages and 3 output stages on each one of the 2 branches of the pump 140. In another embodiment of the present invention, the same charge pump architecture applies when $p \geqq n$ (not shown). In both embodiments, $n \geqq p$, and $p \geqq n$, the assumption is that the number of output stages is not minimized. If this is the case, the charge pump architecture 140 of FIG. 6A is configured to include m=3 different charge pump configurations.

In each of these three configurations, the output node Outp 143, furnishing the voltage Vpump 142 should be properly connected to 1, 2 or 3 pumping stages via the dedicated output stage. The Outp node enters an appropriate voltage regulator (for instance, VXP_REG), that regulates the desired value of the voltage Vpump 142, stopping the pumping clock CK (114 of FIG. 5) of the charge pump. The desired value is digitalized on the five bits (BIT <4:0>). This is how desired voltage outputs are selected.

In one embodiment, every charge pumping stage is driven by 2 signals:

(I) PHP_n, which is the signal that pumps charge on the pumping capacitor;

(ii) PHS_n, which is the signal that opens/closes the internal switches of the pumping stage.

In one embodiment, every output stage is driven by 2 signals:

(iii) PHPo_n, which is the signal that pumps charge on the output capacitor;

(iv) PHSo_n, which is the signal that opens/closes the internal switches of the output stage.

Thus, the charge pump 140 of FIG. 6A is a 4 phases pump. This result can be easily extended to the case of a 2 phases pump. Suppose that the m=3 (n,p) couplets are:

Vpump_1=>(n,p)_1=(3,2);

Vpump_1=>(n,p)_1=(2,2);

Vpump_3=>(n,p)_3=(1,1).

In all 3 configurations, $n \geqq p$. In this example, the number of output stages is not minimized. In the below-giving discussion there is a description of how to manage the switching of an optimized number of output stages.

To implement the tunable pump one starts from a (3×2) pump with 3 output stages and 6 groups of control signals, i.e. 3 couplets (PHP,PHS)_1, (PHP,PHS)_2, (PHP,PHS)_3 for the charge pump stages, and other 3 couplets (PHPo, PHSo)_1, (PHPo,PHSo)_2, (PHPo,PHSo)_3 for the output stages. Regarding the convention used to indicate the phases, if in some figures are represented 2 series stages controlled by the same phases PHP, PHS, it's to be intended that these two series stages work at the same time, but with different phases.

For example, if the 4 phases of the pump are A, B, C, D, two stages controlled in the figures by the same phases PHP, PHS are to be intended as follows:

(I) the first stage is controlled by A and B phases;

(ii) the second stage is controlled by C and D phases.

In one embodiment, the switching from one configuration to another is simply obtained by a control circuitry that properly stops the dedicated phases PHP, PHS of the pump. From (EQ. 4) it is clear that the dynamic charge pump structure 140 of FIG. 6A is more efficient one than a "static" classical (3×2) pump architecture sized for the maximum voltage Vpump_1. TABLE 1 summarizes the working of the dynamic structure 140 of FIG. 6A.

TABLE 1

| Stage/Phase | Enabled/ Working Vpump_1 (3 × 2) | Enabled/ Working Vpump_2 (2 × 2) | Enabled/ Working Vpump_3 (1 × 1) |
|---|---|---|---|
| Stage 1-1 | X | x | x |
| Stage 2-1 | x | x | |
| Stage 3-1 | x | | |
| Stage 1-2 | x | x | x (note 1) |
| Stage 2-2 | x | x | |
| Stage 3-2 | x | | |
| Stage 1-1out | | | X |
| Stage 2-1out | | x | |
| Stage 3-1out | x | | |
| Stage 1-2out | Not present | Not present | Not present |
| Stage 2-2out | | x | |
| Stage 3-2out | x | | |
| (PHP, PHS)_1 | x | x | x |
| (PHP, PHS)_2 | x | x | |
| (PHP, PHS)_3 | x | | |
| (PHPo, PHSo)_1 | | | X |
| (PHPo, PHSo)_2 | | x | |
| (PHPo, PHSo)_3 | x | | |

NOTE (1) Even if unnecessary, stage 1-2 is enabled to simplify the control circuitry.

Referring to TABLE 1, for example, if one would like to enable only the pumping stages 1-1, and 1-2 to work, one should make control signals PHP_1, PHS_1, PHPo_1, and PHSo_1 active, and to disable all other control signals.

FIG. 6B illustrates the working of the control circuitry 180 of the dynamic charge pump structure 140 of FIG. 6A. The control circuitry 180 of FIG. 6B enables/disables the appropriate phases and has as inputs BIT<4:0>, the clock of the pump CKP, and as outputs the signals PHPx, and PHSx. A "PHASE GENERATOR" 182 GENERATES 2 signals: PHP 186, and PHS 188 from the clock CKP signal 181. According to the decoded by DECODING NET block 184 Vpump value carried by BIT<4:0>, the proper enabling signals (ENA_X1, ENA_X2, ENA_X3) are generated, whereas the PHP and PHS signals pass on the appropriate lines to feed the pump stages: PHPS_n, PHS_n, PHPo_n, and PHSo_n.

Suppose, one defines that the BIT<4:0> corresponds to 32 voltage steps of Vpump from 1.75 V up to 9.50 V, each step being 250 mV. Using the above-mentioned approach, if one defines the target Vpump value at 2.5V, one will have the BIT<4:0>=00011. If this is the case, the regulator VXP_REG gets the information and stops the CKP clock when the Vpump becomes higher than the target value. The information is decoded by the control logic which decides (in function of these data) how many stages should be enabled. In this case, according to TABLE 1, at 2.5V Vpump target value, pumping stages 1—1, 1-2, 2-1, 2—2 and output stages 2-1out and 2—2out are enabled and all the others are disabled.

In one embodiment of the present invention, FIG. 7 illustrates the charge pump architecture 200, wherein "n" is always≧"p" (with extension to the case "p" always≧"n"), and the number of output stages is minimized.

The charge pump architecture 200 of FIG. 7 is analogues to the charge pump architecture 140 of FIG. 6A, but with only 2 (p_max) output stages present. The enable output stages are properly connected by means of switches at the output of stage 1—1, or stages 2-1 and 2—2, or stages 3-1 and 3-2.

In one embodiment of the present invention, the choice of switches is such:

if the pump is POSITIVE, n-ch switches could be used; if the pump is NEGATIVE, p-ch switches could be used.

The proper choice of switches allows one to avoid bulk management problems.

Referring still to FIG. 7, in a positive (negative) pump, to turn on (off) the switches, control signals should be referred to a voltage higher (lower) than the highest (lowest) voltage among the Vpump values 204. In one embodiment of the present invention, the auxiliary pump AUX_PUMP block 202 is used to generate a reference voltage 203 for the control signals. The implementation of such an auxiliary pump would not affect the area occupation and the efficiency in terms of total Isupply, if a proper architecture is used (e.g., a diode pump with a (n×1) structure and small pumping capacitors).

Referring still to FIG. 7, the n-ch switches should be properly closed when Vpump_1, Vpump 2, or Vpump 3 are regulated. The auxiliary pump represented by AUX_PUMP block 202 outputs voltage Vaux 203 that is supposed to be greater than the max. Vpump voltage (Vpump_1 in this case). In one embodiment, the AUX-PUMP 202 is implemented as a (4×1) pump with small CP capacitors. The blocks ELEV 208 shift the enable signals Anp (n,p=1 . . . 3) 210 from the Vdd level to the Vaux level (Anp_HV). With respect to FIG. 6A, PHPo and PHSo phases are not needed. The output stages can be controlled by PHP1 and PHS1, since both the first pumping stages and the output stages work in all the m configurations. TABLE 2 summarizes the working of the structure 200 shown in FIG. 7. Even if unnecessary, Stage 1-2 is enabled to simplify the control.

TABLE 2

| Stage/Phase | Enabled/ Working Vpump_1 (3 × 2) | Enabled/ Working Vpump_2 (2 × 2) | Enabled/ Working Vpump_3 (1 × 1) |
|---|---|---|---|
| Stage 1-1 | x | x | x |
| Stage 2-1 | x | x | |
| Stage 3-1 | x | | |
| Stage 1-2 | x | x | x (note 1) |
| Stage 2-2 | x | X | |
| Stage 3-2 | x | | |
| Out Stage 1 | x | x | X |
| Out stage 2 | x | x | x |
| (PHP, PHS)_1 | x | x | x |
| (PHP, PHS)_2 | x | x | |
| (PHP, PHS)_3 | x | | |
| A11_HV | | | x |
| A21_HV | | x | |
| A31_HV | x | | |
| A12_HV | | | |
| A22_HV | | x | |
| A32_HV | x | | |

In one embodiment of the present invention, FIGS. 8A and 8B depict (n×p) and (p×n) charge pump architectures 220. The number of output stages is minimized. More specifically, FIG. 8A illustrates a (4×2) PUMP1 224 with 4 series stages and 2 parallel stages. FIG. 8B illustrates a (2×4) PUMP2 222 with 2 series stages and 4 parallel stages are shown. The following example can be easily extended to the case of two generic pumps, one made of (n×p) stages, and one made of (p×n) stages.

The following description is designated to show how PUMP1 224 can be changed into PUMP2 222 without area waste. The transition between these two pumps is useful in a memory circuitry in which, in two different operational modes, a high Vpump with low Ipump (furnished by PUMP1) or a low Vpump with high Ipump (furnished by PUMP2) is needed.

The total number of pumping stages is NS=4×2=8. The total minimized number of output stages is 4. Individual charge pump stages can be connected in series or in parallel by means of switches, as mentioned in the previous section. In one embodiment, FIG. 9 shows how to implement a flexible (4×2)-to-(2×4) pump. When the (4×2) pump is needed, switches (1) 242, (3) 244 are OFF, and switches (2) 246 are ON. In the (4×2) pump Outp node 248 is connected to 2 output stages, each one terminating two parallel structures each of which includes 4 series stages.

On the other hand, when the (2×4) pump is needed, switches (2) 246 are OFF, breaking the 2 chains of 4 stages into 2 chains of 2 stages each one. Switches (1) 242 are ON, thus giving Vdd 250 as source voltage to the new 2 chains obtained. Switches (3) 244 are ON, thus connecting the two remaining output stages in parallel to the previous two.

FIG. 10 shows the real implementation 260 of the circuitry 240 of FIG. 9 comprising the auxiliary pump 262, the level-shifters for the control signals 264 and 266, the phases enabled or disabled that feed each single stage. Switches (1) 268, (2) 272 and (3) 270 of the pump of FIG. 9 are realized with the passages gated by the Vaux 274 referred signals S1 HV 276, S2 HV 272, and S3 HV 280. Stages 1,2,5,6 are controlled by phases PHP a, PHS a. Stages 3,4,7,8 are controlled by phases PHP b, PHS b. This is not necessary (all the stages are ON in both architectures) but gives more flexibility to this structure, as it will be seen later. Out stages 1o 284 and 2o 286 are always ON, while out stages 3o 288 and 4o 290 are ON only in the (2×4) architecture, hence their control phases are different.

FIG. 11 illustrates how by applying different control phases to the pump architecture 260 of FIG. 10, different configurations can be obtained.

More specifically, having different control phases (PHP, PHS)_a and (PHP, PHS)_b for pumping stages makes possible the following architectures: (4×2) (as described above), (2×4) (as described above), (2×2) is realized by keeping ON stages 3, 4, 7, 8 and out stages 1o, 2o, with switches S1 HV ON and switches S2 HV, S3 HV OFF; and 2 different (2×2) pumps, if two other couplets of switches S4_HV 302, S5 HV 304 are placed after the out stages 3o, 4o, connecting the output node of 3o, 4o to Outp 306 or to another node, the Outp 2 308.

TABLE 3 summarizes the working of the charge pump structure 260 shown in FIG. 10 for the (4×2), the (2×4) and the (2×2) architecture.

TABLE 3

| Stage/Phase | Enabled/ Working Vpump_1 (3 × 2) | Enabled/ Working Vpump_2 (2 × 2) | Enabled/ Working Vpump_3 (1 × 1) |
|---|---|---|---|
| Stage 1 | x | X | |
| Stage 2 | x | X | |
| Stage 3 | x | X | x |
| Stage 4 | x | X | x |
| Stage 5 | x | X | |

TABLE 3-continued

| Stage/Phase | Enabled/ Working Vpump_1 (3 × 2) | Enabled/ Working Vpump_2 (2 × 2) | Enabled/ Working Vpump_3 (1 × 1) |
|---|---|---|---|
| Stage 6 | x | X | |
| Stage 7 | x | X | x |
| Stage 8 | x | X | x |
| Out Stage 1o | x | x | x |
| Out Stage 2o | x | x | x |
| Out Stage 3o | | x | |
| Out Stage 4o | | X | |
| (PHP, PHS)_a | x | x | |
| (PHP, PHS)_b | x | x | x |
| (PHPo, PHSo)_a | | x | |
| (PHPo, PHSo)_b | x | x | x |
| S1_HV | | x | x |
| S2_HV | X | | |
| S3_HV | | x | |

If the output stages are controlled by different phases, as in FIG. 10, switches S3 HV are not necessary: out stages 3o, 4o can be directly connected to the output of stages 2, 6. In this case, when 3o, 4o are not used, their controlling phases should be disabled.

In one embodiment of the present invention, FIG. 12 depicts a transferable (n×p) to a (p×n) pump architecture 320, whereas the number of output stages is not minimized. The 320 architecture is important when in terms of area occupation the number of output stages is not critical. If 320 stricter of FIG. 12 is compared to transferable 220 structure (n×p) to a (p×n) of FIG. 8, it is clear that the structure 320 has the following advantages: the lack of switches referred to the Vaux voltage. Therefore, the AUX-PUMP and the level shifters (blocks ELEV) of structure 220 are not are necessary in the structure 320.

Referring still to FIG. 12, by controlling the phases PHP and PHS, and the switches Sx 322, now referred to Vdd 324, stages 1, 2 and 5, 6 can be connected in series to stages 3, 4 and 7, 8 after a passage into output stages 5o, 6o. When the (4×2) architecture is implemented, the structure is actually made of a (2×2) pump, with its output stages 5o, 6o that feed another (2×2) pump in series, with its output stages 1o, 2o connected to the Outp node 326 and furnishing the desired Vpump voltage 328.

FIG. 13 depicts another charge pump architecture 350 of the present invention, wherein by having dedicated phases (PHP, PHS)_a and (PHP, PHS)_b, another pump architecture can be obtained (for example, a (2×2)), and a greater flexibility can be achieved with all stages controlled by different phases. For example, a (2×1) or a (2×3) structure can be obtained with dedicated phases for stages 1 (352), and 2 (354), 5 (356) and 6 (358), output stage 5o 360, output stage 6o 362, and the switches Sx (becoming S1 364and S2 366).

TABLE 4 summarizes the working of the structure 320 shown in FIG. 12 for the (4×2) and the (2×4) architecture.

TABLE 4

| Stage/Phase | Enabled/Working (4 × 2) architecture | Enabled/Working (2 × 4) architecture |
|---|---|---|
| Stage 1 | x | x |
| Stage 2 | x | x |
| Stage 3 | x | x |
| Stage 4 | x | x |
| Stage 5 | x | x |

TABLE 4-continued

| Stage/Phase | Enabled/Working (4 × 2) architecture | Enabled/Working (2 × 4) architecture |
|---|---|---|
| Stage 6 | x | x |
| Stage 7 | x | x |
| Stage 8 | x | x |
| Out Stage 1o | x | x |
| Out Stage 2o | x | x |
| Out Stage 3o | | x |
| Out Stage 4o | | x |
| Out Stage 5o | x | |
| Out Stage 6o | x | |
| (PHP, PHS)_a | x | x |
| (PHP, PHS)_b | x | X |
| (PHPo, PHSo)_a | | x |
| (PHPo, PHSo)_b | X | X |
| (PHPo, PHSo)_c | x | |
| Sx | | X |

What is claimed is:

1. A modular apparatus for generating a supply voltage internally within an integrated circuit comprising:

a first plurality of parallel-connected blocks of charge pump stages including a first block of charge pump stages, a last block of charge pump stages, and at least one intermediate block of charge pump stages therebetween; wherein each of said parallel-connected blocks of charge pump stages includes a group of a second plurality of charge pump stages cascade-connected in series; and an output stage connected to an output node.

2. A modular apparatus for generating a supply voltage internally within an integrated circuit, said apparatus comprising an integer plurality of M single (N, P) charge pumps, wherein each said single (N, P) charge pump includes an integer P of parallel-connected blocks of charge pump stages comprising a first block of charge pump stages, a last block of charge pump stages, and at least one intermediate block of charge pump stages therebetween; wherein each of said parallel-connected blocks of charge pump stages includes a group of an integer N of said charge pump stages cascade-connected in series; and an output stage connected to an output node; and wherein an integer T of total number of charge pump stages is equal to PMN; and wherein an integer O of output stages is equal to PM.

3. The apparatus of claim 2 wherein in each said single ($n_i$, $p_i$) charge pump, $n_i$ is greater than or equal to $p_i$; and wherein $n_i$ is less than or equal to N; and wherein $p_i$ is less or equal to 2; wherein an integer P is a total number of parallel-connected blocks of charge pump stages; wherein an integer N is total number of charge pump stages cascade-connected in series; and wherein an integer S groups of control signals are used to control each said charge pump stage, and wherein at least one group of said control signals is used to control one said charge pump stage.

4. The apparatus of claim 2 wherein in each said single ($n_i$, $p_i$) charge pump, $p_i$ is greater than or equal to $n_i$; and wherein $p_i$ is less or equal to P; and wherein $n_i$ is less or equal to N; wherein an integer P is a total number of parallel-connected blocks of charge pump stages; wherein an integer N is total number of charge pump stages cascade-connected in series; and wherein an integer S groups of control signals are used to control each said charge pump stage, and wherein at least one group off said control signals is used to control one said charge pump stage.

5. The apparatus of claim 2 further including:

an auxiliary pump configured to generate an auxiliary voltage used as a reference voltage for an integer plurality of $S_1$ control signals;

wherein in each said single ($n_i$, $p_i$) charge pump, $n_i$ is greater than or equal to $p_i$; and wherein $n_i$ is less or equal to N; and wherein $p_i$ is less or equal to P; wherein an integer P is a total number of parallel-connected blocks of charge pump stages; wherein an integer N is total number of charge pump stages cascade-connected in series; and wherein an integer number $MIN_1$ of enabled output stages is minimized; and wherein each said enabled output stage is connected to said output node by using an integer plurality of $U_1$ switches, and wherein at least one said control signal is used to control one said charge pump stage.

6. The apparatus of claim 2 further including:

an auxiliary pump configured to generate an auxiliary voltage used as a reference voltage for an integer plurality of $S_2$ control signals;

wherein in each said single ($n_i$, $p_i$) charge pump, $p_i$ is greater than or equal to $n_i$; and wherein $n_i$ is less or equal to N; and wherein $p_i$ is less or equal to 2; wherein an integer P is a total number of parallel-connected blocks of charge pump stages; wherein an integer N is total number of charge pump stages cascade-connected in series; and wherein an integer number $MIN_2$ of enabled output stages is minimized; and wherein each said enabled output stage is connected to said output node by using an integer plurality of $U_2$ switches, and wherein at least one said control signal is used to control one said charge pump stage.

7. An apparatus for generating a supply voltage internally within an integrated circuit, said apparatus comprising an integer plurality of M single charge pumps; wherein a first single charge pump comprises a single ($n_1$, $p_1$) charge pump; and wherein at least one intermediate single charge pump therebetween comprises a single ($n_i$, $p_i$) charge pump, and wherein a last single charge pump comprises a single ($n_M$, $p_M$) charge pump; each said single ($n_i$, $p_i$) charge pump including a $p_i$ integer of parallel-connected blocks of charge pump stages comprising a first block of charge pump stages, a last block of charge pump stages, and at least one intermediate block of charge pump stages therebetween; wherein each of said parallel-connected blocks of charge pump stages includes a group of an integer $n_i$ number of charge pump stages cascade-connected in series; and an output stage connected to an output node; and wherein an integer O of output stages is equal to $$\sum \frac{i=M}{i=1} (p_i);$$

and wherein an integer T of total number of charge pump stages is equal to $$\sum \frac{i=M}{i=1} (n_i\, p_i);$$

I being an integer less or equal to M.

8. The apparatus of claim 7 including an integer plurality of $Q_1$ different configurations of single charge pumps; wherein for each said configuration each said output stage is connected to said output node, and wherein for each said configuration an integer plurality of $C_1$ charge pump stages is disabled; and wherein said apparatus is adaptively tuned among said plurality of $Q_1$ different configurations by using a plurality of control signals in order to optimize generation of said supply voltage and supply current at said output node, and to minimize a ripple voltage at said output node.

9. The apparatus of claim 8 including an integer plurality of $Q_2$ different configurations of single charge pumps; wherein for each said configuration each said output stage is connected to said output node, and wherein for each said configuration an integer plurality of $C_2$ charge pump stages is disabled; and wherein said apparatus is adaptively tuned among said plurality of $Q_2$ different configurations by using a plurality of control signals in order to optimize generation of said supply voltage and a supply current at said output node, and to minimize a ripple voltage at said output node.

10. The apparatus of claim 9 including:

an integer plurality of $Q_3$ different configurations of single charge pumps;

wherein for each said configuration each said enabled output sta5ge is connected to said output node, and wherein for each said configuration an integer plurality of $C_3$charge pump stages is disabled; and wherein said apparatus is adaptively tuned among said plurality of $Q_3$ different configurations by using a plurality of control signals in order to optimize generation of said supply voltage and said supply current at said output node, and to minimize said ripple voltage at said output node.

11. The apparatus of claim 10, including:

an integer plurality of $Q_4$ different configurations of single charge pumps;

wherein for each said configuration each said enabled output stage is connected to said output node, and wherein for each said configuration an integer plurality of $C_4$charge pump stages is disabled; and wherein said apparatus is adaptively tuned among said plurality of $Q_4$ different configurations by using a plurality of control signals in order to optimize generation of said supply voltage and said supply current at said output node, and to minimize said ripple voltage at said output node.

* * * * *

UNITED STATES PATENT AND TRADEMARK OFFICE
CERTIFICATE OF CORRECTION

PATENT NO. : 6,794,927 B2
APPLICATION NO. : 10/328911
DATED : September 21, 2004
INVENTOR(S) : Lorenzo Bedarida et al.

It is certified that error appears in the above-identified patent and that said Letters Patent is hereby corrected as shown below:

Column 7, line 49: "... Vpump_1 => (n,p)_1 = 2,2;" should read:
-- Vpump_2 => (n,p)_2 =2,2; --.

Column 12, claim 3, lines 46-47: "..., is less or equal to 2; ..." should read:
---..., is less or equal to P; …--.

Column 12, claim 4, lines 61-62: "... At least one group off said control ..."
should read --... at least one group of said control...--.

Column 13, claim 6, line 20: "..., is less or equal to 2; ..." should read
--..., is less or equal to P; …--.

Column 14, claim 10, line 31: "output sta5ge is connected to said output node, and"
should read --...output stage is connected to said output node, and--.

Signed and Sealed this

Sixteenth Day of January, 2007

JON W. DUDAS
*Director of the United States Patent and Trademark Office*